H. R. SMITH.
MOUTH MIRROR.
APPLICATION FILED NOV. 11, 1910.
1,021,639.
Patented Mar. 26, 1912.
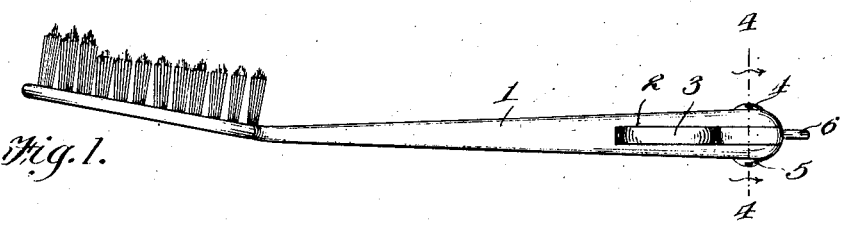
Fig. 1.
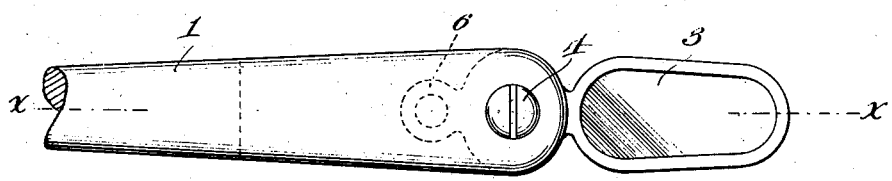
Fig. 2.
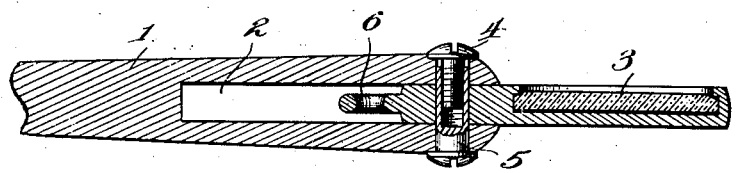
Fig. 3.
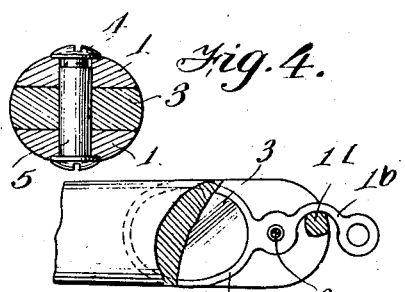
Fig. 4.
Fig. 5.
Witnesses
H. H. Lybrand
U. B. Hillyard
Inventor
Howard R. Smith
By Victor J. Evans
Attorney

UNITED STATES PATENT OFFICE.

HOWARD R. SMITH, OF WASHINGTON, PENNSYLVANIA.

MOUTH-MIRROR.

1,021,639.   Specification of Letters Patent.   Patented Mar. 26, 1912.

Application filed November 11, 1910. Serial No. 591,833.

*To all whom it may concern:*

Be it known that I, HOWARD R. SMITH, a citizen of the United States, residing at Washington, in the county of Washington and State of Pennsylvania, have invented new and useful Improvements in Mouth-Mirrors, of which the following is a specification.

The present invention provides a mirror pivotally connected to a handle in a novel manner to admit of the user inspecting the mouth in connection with a hand mirror or other reflecting surface.

The invention consists of the novel features, details of construction and combination of parts, which hereinafter will be more particularly set forth, illustrated in the accompanying drawing, and pointed out in the appended claims.

Referring to the drawing, forming a part of the application, Figure 1 is a side view of a tooth brush provided with a mirror attachment mounted to swing into and out of a transverse recess formed in the handle. Fig. 2 is a plan view of the handle of the tooth brush, showing the mirror swung open. Fig. 3 is a longitudinal section on the line $x$—$x$ of Fig. 2. Fig. 4 is a transverse section on the line 4—4 of Fig. 1, looking in the direction of the arrows. Fig. 5 is a view similar to Fig. 2 of a modification, parts being broken away.

Corresponding and like parts are referred to in the following description, and indicated in all the views of the drawing, by the same reference characters.

The handle 1 has a recess 2 in its outer end within which the mirror 3 is adapted to fold, said mirror comprising a frame and a glass fitted within the frame and having a reflecting surface. The frame protects the looking glass and also provides substantial means for connecting the mirror to the handle. The mirror 3 may be of any size so as to fold snugly within the recess 2. The pivot fastening for connecting the mirror to the handle is adjustable to create and maintain proper friction between the pivot end of the mirror and the separated portions of the handle bordering upon the recess 2 so as to hold the mirror in the desired angular position. The pivot fastening comprises a member 4, which is formed of a flat head and a threaded stem, and a member 5, the latter also consisting of a flat head and a stem, the latter being hollow and internally threaded to receive the stem of the member 4. The flat heads of the members 4 and 5 insure an extended engagement with the parts of the handle 1 bordering upon the recess 2, this being of especial advantage when the handle of the tooth brush is formed of bone or like material liable to become easily broken. The flat heads of the members of the pivot fastening distribute the strain and prevent their working through the parts of the handle.

When the mirror is folded the tooth brush may be used in the ordinary way without being impeded by the attachment of the mirror thereto. Should it become necessary to inspect the mouth for any purpose the mirror is swung outward from the recess 2 and is turned to a convenient angle according to the part of the mouth to be observed. The mirror attached to the handle 1 is to be used in connection with a hand mirror in order to reflect the image thereon so that the reflection may be readily seen. When the mirror is not required for immediate use it is folded within the recess and is protected by the walls thereof and held out of the way. A ring 6 is fitted to the inner or pivot end of the mirror and serves as convenient means for suspending the tooth brush from a nail or hook when not required for use.

In the modification illustrated in Fig. 5 the frame 8 inclosing the mirror 3 is pivoted to the handle at 9 and has an arm 10 terminating at its outer end in an eye, said arm engaging a portion of the handle of the tooth brush, as indicated at 11, which part forms a stop.

From the foregoing description, taken in connection with the accompanying drawings, the advantages of the construction and of the method of operation will be readily apparent to those skilled in the art to which the invention appertains, and while I have described the principles of operation of the invention, together with the device which I now consider to be the best embodiment thereof, I desire to have it understood that the device shown is merely illustrative, and that such changes may be made when desired as are within the scope of the claims appended hereto.

Having thus described the invention what is claimed as new, is:—

1. In combination with a handle having a recess in the outer end thereof, a mirror, and a pivot fastening connecting the mirror and the outer ends of the parts of the handle bordering upon the recess, said pivot fastening comprising complemental members each formed of a flat head and a threaded stem whereby the parts of the handle bordering upon the recess may be drawn together to create a friction upon the mirror to hold the latter in the required adjusted position.

2. In combination a handle having a recess in one end thereof and having a portion extending across the recess near the outer extremity thereof, a frame arranged within the said recess and provided with a mirror, a fastening pivotally connecting said frame to the parts of the handle bordering upon the recess, and an arm projecting from the pivoted frame and adapted to engage the part of the handle extending across the outer end of the recess, said arm having its projecting end formed with an eye.

In testimony whereof I affix my signature in presence of two witnesses.

HOWARD R. SMITH.

Witnesses:
MARY L. PATTERSON,
GUY J. G. TAYLOR.